INVENTORS
ROBERT M. HENDERSON
RICHARD ZECHLIN

INVENTORS
ROBERT M. HENDERSON
BY RICHARD ZECHLIN

Diggins, O'Boyle + Harmon
ATTORNEYS

United States Patent Office 3,304,488
Patented Feb. 14, 1967

3,304,488
ELECTRONIC CURRENT REGULATOR
Robert M. Henderson, Williams Bay, and Richard Zechlin, Beloit, Wis., assignors, by mesne assignments, to Fairbanks Morse Inc., New York, N.Y., a corporation of Delaware
Filed Apr. 17, 1963, Ser. No. 273,740
11 Claims. (Cl. 322—27)

This invention relates to current regulators generally, and more particularly to an improved electronic current regulator especially adapted for use with generator voltage regulation systems.

It is often desirable to combine generator voltage regulation systems, and particularly D.C. voltage regulating systems, with a current regulator designed to permit a maximum continuous generator armature current without exceeding the rated maximum continuous current of the regulated generator. Ideally, this current regulator should be capable of rapid operation to positively restrict the armature current to a safe value at any level of voltage.

The current regulators previously employed with mechanical and static regulator systems have often been severely restricted by ambient environmental conditions, operational voltage requirements, space limitations, dirt, wear, and other similar factors which directly affect the operational stability of such regulators.

The primary object of this invention is to provide an improved electronic current regulator.

Another object of this invention is to provide an improved electronic current regulator especially adapted for use with generator voltage regulation systems.

A further object of this invention is to provide an improved electronic current regulator for use with generator voltage regulation systems which will accurately regulate a generator armature current when subjected to a wide range of ambient temperature conditions.

Another object of this invention is to provide an improved electronic current regulator for use with generator voltage regulation systems which will accurately maintain any selected value of generator armature current.

A further object of this invention is to provide an improved electronic current regulator for use with generator voltage regulation systems which will provide regulation of a pre-selected current from the rated generator voltage down to a very low voltage and will not allow the current to permanently exceed the pre-selected regulation point under any conditions.

Another object of this invention is to provide an improved electronic current regulator for use with generator voltage regulation systems which is inexpensive, employs no moving parts, and is compact in size so that no change in the outlined dimensions of a voltage regulator is necessitated when the current limiter is added to the regulator.

A further object of this invention is to provide an improved electronic current regulator for use with generator voltage regulation systems which requires little power to provide an accurate current regulating function.

Another object of this invention is to provide an improved electronic current regulator for use with generator voltage regulation systems which can be easily adjusted for a wide range of armature currents and a wide variety of generators.

A still further object of this invention is to provide an improved electronic current regulator for use with generator voltage regulation systems which can regulate the generator armature current over a wide range of generator speeds.

With the foregoing and other objects in view, this invention resides in the following specification and appended claims, certain details of construction being illustrated in the accompanying drawings in which:

Figures 1, 2:
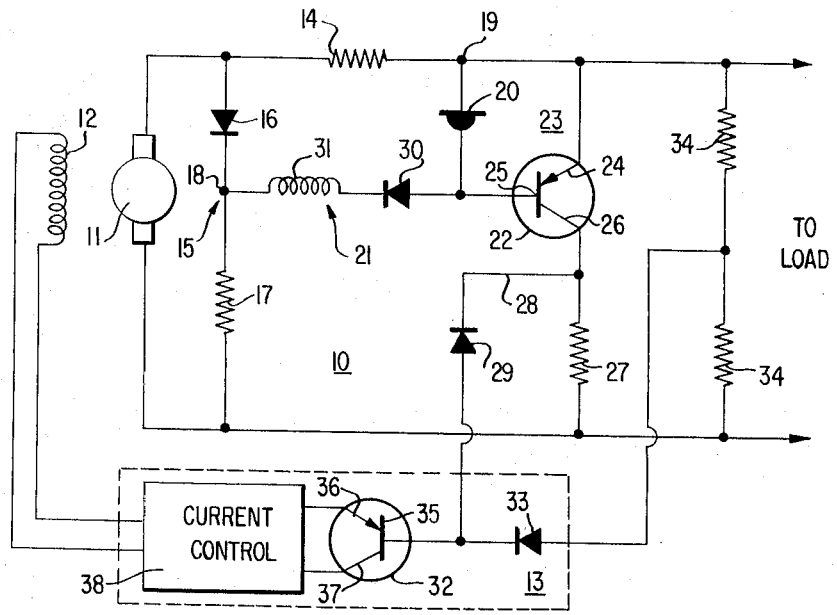
FIGURE 1 is a circuit diagram of the electronic current regulator of the present invention.
FIG. 2 shows the current-voltage characteristic of the hybrid circuit of the present invention.

The electronic current regulator of the present invention advantageously employs the negative resistance of a circuit having both positive and negative resistance characteristics to achieve accurate regulation of the armature current of a generator. Current control by the regulator of the present invention is accomplished through the regulation of the generator voltage regulator, which in turn controls the current provided to the field windings of the generator. The voltage regulator per se is not a necessary functional part of the current regulator, but the parts of the voltage regulator may be advantageously employed in combination with the invention to control the armature current through direct control of the generator field. This voltage regulator control is governed by the current regulator, which, in addition to a control circuit having positive and negative resistance characteristics, includes a first resistance means connected in series with the generator armature and a biasing circuit connected across the generator armature. The difference between the reference voltage developed across the biasing circuit and the voltage drop across the first resistance means is sensed by the combination of the control circuit having positive and negative resistance characteristics and a second resistance means. The second resistance means in turn serves as the load for the control circuit and establishes a D.C. load line intersecting the current-voltage characteristic curve of the control circuit. In accordance with known principles, the slope of the D.C. load line is determined by the resistance value of the second resistance means, and the position of the load line with respect to this current-voltage characteristic curve is determined by the above-mentioned voltage difference value. In addition, the parameters of the circuit are selected so that a very minute variation in the position of the load line will change the point of intersection thereof with the current-voltage characteristic curve of the control circuit from a stable peak point to a stable low point on the characteristic curve. This slight movement of the D.C. load line is caused by the changing armature current and consequent change in the voltage value across the second resistance means which results in a variation of the above-mentioned voltage difference value. The control circuit is rendered fully conducting when the load line intersects the stable high voltage or valley point in the current, and non-conducting when the load line is moved to intersect the stable low voltage or peak point in the current on the characteristic curve of the control circuit. The circuit of the current regulator of the present invention may be designed so that a variation of the position of the D.C. load line and a corresponding shift in the points of intersection with the characteristic curve of the control circuit may be initiated by very minute changes in armature current resulting in corresponding changes in the voltage value across the second resistance means, so that the regulator is permitted to maintain close current regulation.

Referring now to FIGURE 1, the current regulator circuit of the present invention, indicated generally at 10, may be employed to control the armature current of a generator having an armature 11 and a field winding 12 which is subjected to regulation by a voltage regulator 13 of known construction. At this point it should be noted that in the exemplified embodiment the current regulator 10 is tied to the voltage regulator of the generator because the voltage regulator provides a readily available circuit for regulating the current to the field windings of the generator. However, the current regulator 10 need not necessarily be employed with a circuit connected to provide voltage regulation, but conversely may be employed with any circuit capable of selectively regulating the current applied to the control or field windings of a generator upon the reception of a control potential.

The current regulator 10 includes a resistor 14 which is connected in series with the armature 11 of the generator to the generator load, and a biasing circuit 15 connected across the armature of the generator. Biasing circuit 15 includes a rectifier 16 and a series resistor 17.

It may now be noted that the current from the armature 11 of the generator develops a first voltage across the resistor 14, and a second substantially constant reference voltage across the diode 16 of the biasing circuit 15. The magnitude of the voltage developed across the diode 16 is determined primarily by the impedance characteristic of the diode utilized, and which may be a silicon rectifier having a known voltage characteristic.

The voltage difference between the voltages developed across the resistor 14 and the rectifier 16 may be measured or sensed across points 18 and 19 in the regulator circuit, and this sensing is accomplished by means of a single junction, semi-conductor diode 20, a resistive circuit 21, and a transistor 22. It is apparent from the basic circuit analysis that the sum of the voltage drops across resistor 14, diode 20 and parallel with the emitter-base junction of transistor 22, and resistive circuit 21 is equal to the voltage drop across diode 16. As a result, since the voltage across diode 16 remains constant with changes in armature current, the voltage between points 18 and 19 will vary in dependence upon the voltage drop across resistor 14 as the armature current varies. This voltage difference between points 18 and 19 will hereinafter be referred to as voltage $E_A$.

The single junction semi-conductive diode 20 is of a type which exhibits a region of negative resistance at the low forward voltage range of its current-voltage characteristic, and may be a tunnel diode of the type well known to the art. The diode 20 is connected with the transistor 22 to form a semi-conductor hybrid control circuit 23 which has a circuit characteristic illustrated by the curve OTQSR of FIGURE 2. This curve represents values of voltage V across points 19 and 19a versus combined current I through diode 20 and emitter-base junction of transistor 22.

The transistor 22 includes an emitter electrode 24 connected with the resistor 14, a base electrode 25 connected to the resistance circuit 21 and the diode 20, and a collector electrode 26 connected through a resistor 27 to the negative side of the generator armature 11. An output circuit 28 including a diode 29 provides a control function for a control element in the voltage regulator 13, such control being determined by the conductive state of the hybrid circuit 23.

Resistive circuit 21 includes a diode 30 and a resistive element 31 connected serially between the biasing circuit 15 and the base 25 of the transistor 22. Preferably, for reasons to be set forth hereinafter, the resistive element 31 is formed by an inductor having a preset resistance determined by the construction of the inductor coils. The diode 30 permits the regulator 10 to operate accurately when only extremely low voltages are developed across the resistor 14.

The operation of the electronic current regulator of the present invention may best be described with reference to FIGURE 1 and the current-voltage characteristic curve of the hybrid circuit 23 as illustrated by FIGURE 2.

The output current from the armature 11 causes voltages to develop across the resistor 14 and the diode 16. The difference between the voltages across the diode 16 and the resistor 14 as measured between points 18 and 19 in FIGURE 1, is a voltage indicated as $E_A$ in FIGURE 2, and this same difference voltage is developed across the series combination of the resistance circuit 21 and the hybrid circuit 23 and effectively forms the supply voltage for the control circuit 23. The winding resistance of the inductor 31 provides a resistive load line for the hybrid circuit 23, indicated by the straight line bisecting point S and a value $E_A$ on the abscissa in FIGURE 2. The peak and valley regions of the curve are indicated in FIGURE 2 at the point Q and at the point S, respectively, and for voltage values below Q and above S the voltage across the hybrid circuit tends to remain stable for a given $E_A$. With a load line having the slope indicated in FIGURE 2, two stable hybrid circuit operating regions occur. The first region is formed below a load line passing through the point $(I_p)$ $(V_p)$ and in this region the transistor 22 does not conduct. The second stable region is formed above a load line passing through the valley point $(I_v)$ $(V_v)$ and in this region the transistor 22 conducts. If the current is operating in the non-conducting region, a small increase in the voltage $E_A$ across the resistance circuit 21 and the hybrid circuit 23 will result in a shift in the load line to the right in FIGURE 2 and a consequent shift of the operating point of the hybrid circuit 23 to the conducting region and, conversely, a slight decrease in $E_A$ when operating in the conducting region $E_{A2}$ will shift the load line to the left in FIGURE 2 to return the operating point to the non-conducting region. This shift in position of the resistive load line in accordance with the change in the difference voltage $E_A$ across the hybrid and resistance circuit resulting in variation in armature current through resistor 14 is illustrated by the broken line paralleling the solid load line in FIGURE 2.

When the current in resistor 14 increases beyond a predetermined value, a decrease in the difference voltage $E_A$ developed across the resistance circuit 21 and the hybrid circuit 23 causes the resistive load line in FIGURE 2 to move to the broken line position and bisect point Q. In this low voltage region, the transistor 22 does not conduct. However, when the current from the armature 11 through the resistor 14 is lower than a predetermined value, the decrease in the difference voltage $E_A$ moves the resistive load line to a position bisecting point S in FIGURE 2, and in this high voltage region the transistor 22 conducts.

To illustrate the manner in which the hybrid circuit 23 controls the voltage regulator 13 and thereby the field windings 12 of the generator, a control transistor 32 and Zener diode 33 for the voltage regulator 13 of FIGURE 1 have been provided. A sensing Zener diode-control transistor combination are well known to the transistorized voltage regulator art, and such a combination is illustrated in Patent 3,056,913 to R. M. Henderson, et al. The voltage regulator system illustrated by the aforementioned patent could well constitute the voltage regulator 13 of FIGURE 1, but it is emphasized that the transistor 32 and the Zener diode 33 are included in FIGURE 1 for illustrative purposes only, and the current regulator 10 may be employed in combination with a wide variety of voltage regulator circuits known to the prior art.

With reference to FIGURE 1, it will be noted that the Zener diode 33 senses the voltage output of the generator which is developed across any suitable resistive network 34. The transistor 32 includes a base electrode 35 which is connected to the Zener diode 33 and also to the diode 29. The remaining electrodes 36 and 37 of the transistor 32 are suitably connected to the remaining circuit elements of the voltage regulator 13. Many voltage regulators include a current control system indicated generally at 38 which operates under the control of the transistor 32 to control the provision of current to the field winding 12 of the generator in response to the amount of current which is permitted to flow from base electrode 35 of transistor 32 through Zener diode 33 and resistance 34.

Considering now the operation of the electronic current regulator 10 in combination with the voltage regulator 13, when the current in the resistor 14 is lower than a predetermined value, transistor 22 conducts through resistor 27 and biases the collector 26 of the transistor 22 with respect to the base 35 of the transistor 32, so that no significant current can flow through the diode 29. The transistor 32 can still conduct, but only under the control of the Zener diode 33, and therefore the current through the field winding 12 is controlled only in accordance with the output voltage of the generator sensed by the Zener diode 33.

When an increase in the output current from the armature 11 of the generator causes the current through the resistor 14 to rise beyond a predetermined upper limit value, the difference voltage $E_A$ across the resistance circuit 21 and the hybrid circuit 23 shifts the position of the load line in FIGURE 2, and the hybrid circuit is shifted to the low voltage region of the characteristic curve where the transistor 22 is rendered non-conductive. When the transistor 22 ceases to conduct, the diode 29 is forward biased and allows current to be diverted from the base 35 of the transistor 32 through the diode 29 and the resistor 27. The provision of an additional electrical path from the base of the transistor 32 through the diode 29 and the resistor 27 permits the transistor 32 to conduct through diode 29 free from the control of the Zener diode 33, and this conduction of the transistor 32 causes the current control unit 38 to remove current from the field winding 12 of the generator. When the output current from the armature of the generator returns to a predetermined level, the transistor 22 is again caused to conduct, and current ceases to flow through the diode 29. The transistor 32 is again brought under the exclusive control of the voltage sensed by the Zener diode 33, and the voltage regulator 13 is permitted to operate separately from the current regulator 10, a condition which is maintained until the current through the resistor 14 again rises beyond a predetermined level.

Figure 3:
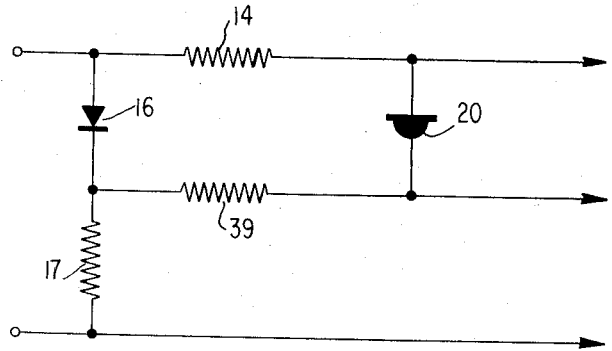
FIG. 3 illustrates an embodiment of the resistive circuit for the current regulator of the present invention.

It is quite obvious that the current regulator 10 of the present invention would be operable if a resistor were substituted for the diode 30 and the inductor 31 as indicated by the resistor 39 of FIGURE 3. The substitution of the resistor 39 for the inductor 31 renders it essential that the resistance of the resistor be high enough to make the load line of FIGURE 2 have less negative slope than the negative portion of the hybrid curve. If it had more negative slope (that is, if it were more vertical on FIGURE 2 than the negative resistance characteristic of the hybrid curve) it would be possible for the operating point of the hybrid circuit to "slide up and down the negative part of the curve" for variations in $E_A$. Such an effect would be detrimental to regulator operation. On the other hand, if the load line is nearly horizontal, two large a change in $E_A$ would be required to control the switching and thus an undesirably large oscillation in the armature current would result.

When a tunnel diode is employed as the diode 20, the switching action of this diode would be in the nano-second range, while the switching ability of the transistor 22 is in the micro-second range. Thus, with the resistor 39 replacing the diode 30 and the inductor 31, the switching action of the hybrid circuit 23 would take place at very high frequencies under some conditions, thereby creating an intolerable operating condition.

Additionally, the difference in the characteristics of various hybrid circuits which might be utilized for the hybrid circuit 23 might cause a resistance value of the resistor 39 which would be proper for one hybrid circuit to be improper for another. If the resistance value of the resistor 39 were improper, such as when this resistance is too high, the resistance load line of FIGURE 2 might be positioned with respect to the characteristic curve of the hybrid circuit in a more horizontal orientation which would require a relatively large change in the difference voltage $E_A$ to accomplish the switching between points Q and S as will be described hereinafter. This situation would cause unsatisfactory current surges in the output from the generator armature 11.

The possibilities of high frequency switching in the hybrid circuit 23 and current surges in the output from the generator armature are eliminated by the utilization of the inductor 31 having resistance coils rather than an ordinary resistor 39.

The value of replacing an ordinary resistor with the inductor 31 may be ascertained by referring to the curve of FIGURE 2. Assuming that the current through the resistor 14 is such that the hybrid circuit 23 is operating at point Q, a decrease in armature current causes the circuit to attempt to switch its conduction condition from point Q to point S by shifting the load line. This means that since a change in the current flow through the diode 20 and the transistor 22 must be applied through an inductance, the current cannot change instantaneously, and so the voltage across the diode 20 and the transistor 22 jumps to point R instantaneously. The current will then decrease with a delay to slowly shift the operating point from point R to point S, the time constant depending upon the resistance and inductance of the resistive circuit 21.

Conversely, if the hybrid circuit 23 is operating at point S and an increase in armature current occurs, the operating point will attempt to shift to point Q on the characteristic, but the voltage across the diode 20 and the transistor 22 will decrease to a point T, due to the delay in current increase caused by inductor 31 and then the current will increase until the operating point is moved to point Q, again at a predetermined rate.

This action, in effect, limits the upper frequency at which the hybrid circuit 23 can switch, and therefore eliminates any difficulties caused by a high rate of switching.

It can be seen that when the resistor 39 is employed in the resistive circuit 21, that the resistance of the resistor must be such that the slope of the resistive load line is less than the slope of the negative resistance portion of the hybrid characteristic. Thus the resistive load line is set so that it crosses the hybrid curve at either a high voltage point or a low voltage point, and the load line is not allowed to intersect the hybrid curve in the negative resistance region thereof. With the employment of the inductor 31, however, it is impossible for the load line to intersect the negative resistance region of the hybrid curve.

To understand the operation of the inductor 31, first assume that the current in the resistor 14 is such that $E_A$ is greater than $E_{A2}$. It can be seen that the hybrid output is producing a current one hundred percent of the time under these conditions. Now assume that a new current in resistor 14 becomes less than such that $E_A$ is $E_{A1}$. The hybrid circuit 23 is now producing current 0 percent of the time.

Assuming now a third condition wherein the slope of the resistive load line is more vertical than the slope of the negative resistance portion of the hybrid curve of FIGURE 2. It will be seen that the load line will then normally pass through the negative portion of the hybrid circuit. This unacceptable condition is prevented by the inductor 31, as will be seen by recalling the T, Q, R, S, T loop illustrated by FIGURE 2. If, instead of assuming that the load line, which is more vertical in slope than the negative resistance portion of the hybrid curve, is at a point where the line and the characteristic cross, it is assumed that the line is trying to reach this point by moving from either above $E_{A2}$ or below $E_{A2}$, it may be seen that it is impossible to reach a crossing point between the load line and the negative resistance portion of the curve. Instead, the inductor forces movement about the T, Q, R, S, T loop, and no intersection with the negative resistance portion of the characteristic curve occurs.

From previous analysis we have seen both the hundred percent conduction and the zero percent conduction conditions for different $E_A$'s, and the value of $E_A$ between must be also less than a hundred percent and greater than zero percent conduction. If, without the inductor 31, the load line would cross the negative resistance characteristic of the hybrid curve of FIGURE 2 halfway between points Q and S, it can be determined that half the time required to complete the loop T, Q, R, S, T will be spent between points R and S, and the other half between points T and Q. Thus, the field winding 12 of the generator will be regulated to receive current half the time and to receive no current during the remaining half of the time.

If the field current developed for a turn-on condition of fifty percent is exactly correct to maintain a desired armature current, the circuit would remain at this switching point. If the field current at this switching rate is too high, it will increase the armature current. As the armature current is increased, $E_A$ will reduce, moving the load line closer to point Q and increasing the amount of time it takes to traverse from T to Q and decreasing the time to traverse from R to S. The output of the hybrid circuit 23 will be nonconductive more of the time and thus the field circuit will be nonconductive more of the time and will therefore reduce the field current.

The reverse action takes place if the armature current is initially low. If the current through resistor 14 is low, $E_A$ will increase toward S, the time to traverse from R to S will become longer, and the hybrid output circuit will conduct for a longer time. The field circuit will conduct longer and the field current will increase, thus increasing the armature current.

Figure 4:
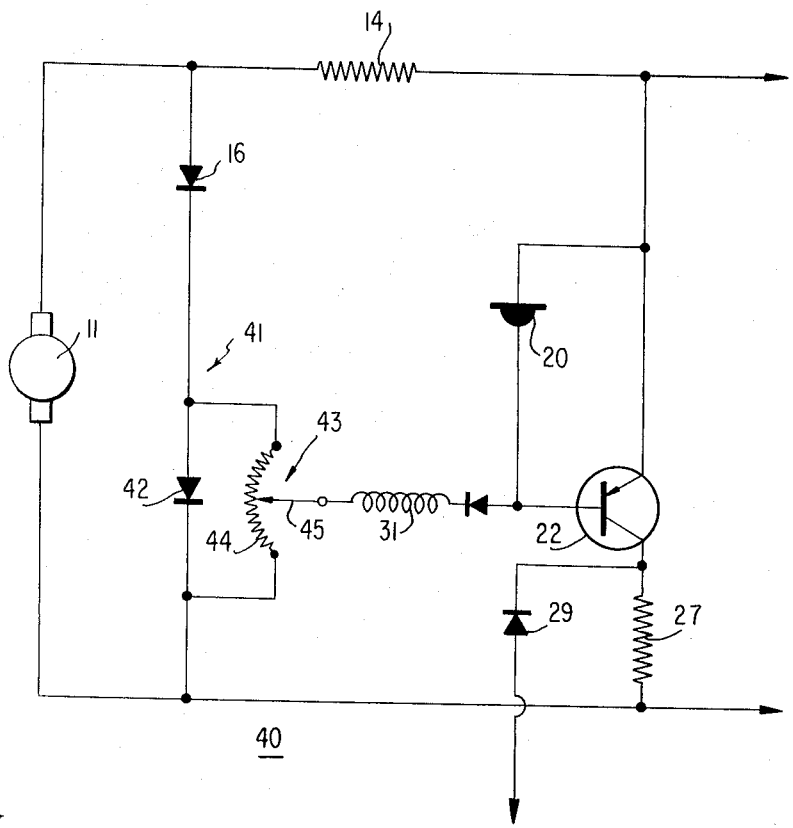
FIG. 4 illustrates an embodiment of the electronic current regulator of the present invention.

Referring now to FIGURE 4, a modification of the current regulator 10 of FIGURE 1 is illustrated generally at 40. The components of the current regulator 40 which are identical to components illustrated in FIGURE 1 are referenced with the same numerals, and it may be noted that the major modification of the regulator circuit 40 is incorporated within the biasing circuit indicated generally at 41.

Biasing circuit 41, which shunts the armature 11 of a generator in a manner similar to that illustrated by FIGURE 1, includes a diode 16 and a second diode 42. Diode 42 is placed between diodes 16 and resistor 17 of FIGURE 1, and is shunted by a rheostat 43. Rheostat 43 includes a resistance element 44 connected in shunt with the diode 42 and a movable contact 45 which is electrically connected to the inductor 31 of the resistance circuit 21.

The current regulator circuit 40 operates in much the same manner as the regulator circuit 10 of FIGURE 1, but additionally, the regulator circuit of FIGURE 4 is capable of performing a variable current limiting function not easily performed by the regulator circuit 10. The rheostat contact 45 may be connected to any suitable mechanical means, so that the rheostat contact may be moved to various positions along the resistance 44 while the regulator circuit 40 is in operation. The rheostat 43 controls the bias of the diode 42, and therefore variation of the position of the movable contact 45 will change the voltage across the diode 42. Variations of the voltage drop across the diode 42 will, in turn, vary the voltage drop across the resistor 14, thereby varying the value of armature current which the regulator 40 will maintain.

It will thus be apparent to those skilled in the art that the present invention provides a simple and effective current regulator for generator systems of compact size which is capable of accurately limiting the maximum continuous armature current of a generator. The arrangement and types of components utilized within this invention may be subject to numerous modifications well within the purview of this inventor who intends only to be limited to a liberal interpretation of the specification and appended claims.

What is claimed is:
1. An electronic current regulator for use with a generator having an armature circuit, a field circuit, and field current control means to control the flow of current to said field circuit, said current regulator comprising first resistance means connected in series with said armature circuit for developing a first voltage thereacross which varies with variations in armature current, bias circuit means connected across said armature circuit for developing a reference voltage, control circuit means connected to said first resistance means having a current-voltage characteristic exhibiting both positive and negative resistance characteristics and conductive and non-conductive states, output circuit means connected between said control circuit means and said field current control means for controlling said field current control means in response to non-conduction of said control current means, and second resistance means interconnecting said bias circuit means and said control circuit means, the difference voltage between said reference voltage and said first voltage being applied as a voltage source to said control circuit means and said second resistance means being connected as a load for said control circuit means so as to effect switching of said control circuit means from said conductive to said non-conductive states upon increase in armature current beyond a predetermined level effecting variation in said difference voltage.

2. An electronic current regulator for use with a generator having a field circuit controlled by a voltage regulator and an armature circuit, said current regulator comprising first resistance means connected in series with said armature circuit for developing a first voltage thereacross which varies with the variations in armature current, bias circuit means connected across said armature circuit for developing a reference voltage, semi-conductor hybrid circuit means connected to said first resistance means exhibiting a region of negative resistance at the low forward voltage range of its current-voltage characteristic and having conductive and non-conductive states, and second resistance means interconnecting said bias circuit means and said hybrid circuit means, the difference voltage between said reference voltage and said first voltage being applied as a voltage source to said hybrid circuit means and said second resistance means being connected as a load for said hybrid circuit means so as to effect switching of said control circuit means from said conductive to said non-conductive states upon increase in armature current beyond a predetermined level effecting variation in said difference voltage, and output circuit means connected between said voltage regulator and said hybrid circuit means for controlling said voltage regulator to reduce the current in said field circuit only when said hybrid circuit means is in said non-conductive state.

3. The electronic current regulator of claim 2 wherein said second resistive means includes inductive means, said inductive means operating to prevent the rapid switching of said hybrid circuit means between said conductive and non-conductive states.

4. The electronic current regulator of claim 2 further including variable resistance means connected to said second resistance means and said bias circuit means for varying the resistance of said bias circuit means to regulate the voltage drop across said first resistance means.

5. The electronic current regulator of claim 2, wherein said bias circuit means includes first and second serially connected diode elements, variable resistance means shunting said second diode element, said variable resistance means including a resistance element connected across said second diode element and a movable contact for movement along said resistance element.

6. The electronic current regulator of claim 2 wherein said hybrid circuit means includes a semiconductor having a base electrode, an emitter electrode connected to said first resistance means, and a collector electrode, and a single junction semiconductor means connected between the base and emitter electrodes of said semiconductor, said single junction semiconductor means exhibiting a region of negative resistance at the low forward voltage range of its current voltage characteristic.

7. The electronic current regulator of claim 6 wherein the resistance value of said second resistance means is such that the load line of the hybrid circuit means is caused to intersect a high voltage region on the current-voltage characteristic curve for said hybrid circuit means when the output current of said armature is below a predetermined value and said semi-conductor is rendered conductive, and is caused to intersect a low voltage region on the current-voltage characteristic curve of said hybrid circuit means when the output current from said armature circuit is above a predetermined value and said semi-conductor is rendered non-conductive.

8. The electronic current regulator of claim 7 wherein said second resistance means includes an inductance means for precluding the rapid switching of said hybrid circuit means from the first to the second conductive state.

9. The electronic current regulator of claim 7 wherein said output circuit means includes a diode connected between said voltage regulator and the collector electrode of said semi-conductor, said diode being biased to prevent current flow therethrough from said voltage regulator when said semi-conductor is in a conductive condition and biased to permit current flow from said voltage regulator when said semi-conductor is in a non-conductive condition.

10. The electronic current regulator of claim 8 wherein said output circuit means includes a diode which is biased to prevent current flow therethrough when said hybrid circuit means is in a conductive state and to permit current flow therethrough when said hybrid circuit means is in a non-conductive state, whereby said voltage regulator is caused to block current flow through said field circuit upon the non-conduction of said hybrid circuit means.

11. An electronic current regulator for use with a generator having a field circuit controlled by a voltage regulator and an armature circuit, said current regulator comprising first resistance means connected in series with said armature circuit for developing a first voltage thereacross which varies with the variations in armature current, bias circuit means including a first diode and a bias resistor connected in series across said armature circuit for developing a reference voltage of substantially constant value across said first diode, semiconductor hybrid circuit means including a transistor having a base electrode, an emitter electrode connected to said first resistance means, a collector electrode, and a tunnel diode connected between the base and emitter electrodes of said transistor, said hybrid circuit means exhibiting a region of negative resistance at the low forward voltage range of its current-voltage characteristic and having conductive and non-conductive states, impedance means including a second diode and an inductance means connected in series between the base electrode of said transistor and the point of interconnection between said first diode and said bias resistor, and output circuit means including a third diode connected between said voltage regulator and the collector electrode of said transistor, said third diode being biased for conduction of control currents from said voltage regulator only when said hybrid circuit means is in its nonconductive state to thereby effect reduction of the field current of said generator, said first resistance means and said impedance means being proportioned such that the resulting voltage drop across said hybrid circuit means provides for switching of said hybrid circuit means from its conductive to its nonconductive state upon increase of the armature current above a predetermined level.

References Cited by the Examiner
UNITED STATES PATENTS

| | | | |
|---|---|---|---|
| 2,996,655 | 8/1961 | Byles | 322—25 |
| 3,022,455 | 2/1962 | Hetzler et al. | 322—25 |
| 3,059,167 | 10/1962 | Byles | 322—25 |
| 3,069,616 | 12/1962 | Curtis | 322—25 |
| 3,133,210 | 5/1965 | Leurgans. | |
| 3,201,679 | 8/1965 | Buchanan et al. | 322—25 |
| 3,214,608 | 10/1965 | Mollinga. | |

OTHER REFERENCES

IBM TECH., Disclosure Bulletin, vol. 4, No. 7, p. 54, December 1961, T. D. Ward.

MILTON O. HIRSHFIELD, *Primary Examiner.*

J. J. SWARTZ, *Assistant Examiner.*